United States Patent
Sibilli et al.

(10) Patent No.: US 11,846,234 B2
(45) Date of Patent: Dec. 19, 2023

(54) INSTALLATION FOR SUPPLYING CRYOGENIC FUEL TO THE COMBUSTION CHAMBER OF A TURBINE ENGINE

(71) Applicant: SAFRAN, Paris (FR)

(72) Inventors: Thierry Sibilli, Moissy-Cramayel (FR); Sarah Rebholz, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 17/999,832

(22) PCT Filed: May 27, 2021

(86) PCT No.: PCT/FR2021/050963
§ 371 (c)(1),
(2) Date: Nov. 23, 2022

(87) PCT Pub. No.: WO2021/240114
PCT Pub. Date: Dec. 2, 2021

(65) Prior Publication Data
US 2023/0212983 A1  Jul. 6, 2023

(30) Foreign Application Priority Data
May 28, 2020 (FR) ........................... 2005640

(51) Int. Cl.
*F02C 7/224* (2006.01)
*F02C 3/20* (2006.01)
*F02C 7/14* (2006.01)

(52) U.S. Cl.
CPC ............... *F02C 7/224* (2013.01); *F02C 3/20* (2013.01); *F02C 7/14* (2013.01)

(58) Field of Classification Search
CPC ...... F02C 7/12; F02C 7/14; F02C 7/22; F02C 7/224; F02C 3/20; F02C 3/22; F02C 3/24
See application file for complete search history.

(56) References Cited

U.S. PATENT DOCUMENTS 5,272,870 A    12/1993  Grieb et al.
9,932,124 B2    4/2018  Kamath et al.
(Continued)

FOREIGN PATENT DOCUMENTS

EP    2 587 024 A2    5/2013

OTHER PUBLICATIONS

French Search Report for FR 2005640, dated Jan. 27, 2021.
International Search Report for PCT/FR2021/050963, dated Sep. 17, 2021.

*Primary Examiner* — William H Rodriguez
(74) *Attorney, Agent, or Firm* — Sughrue Mion, PLLC

(57) ABSTRACT

An installation for supplying a cryogenic fuel to a combustion chamber of a turbine engine of an aircraft including a tank, a mixing chamber, and one or more heat exchangers. The tank stores cryogenic fuel in a and connects to a combustion chamber for supplying the combustion chamber with cryogenic fuel in the supercritical or gaseous state. The one or more heat exchangers are provided between the cryogenic fuel and air of an air-conditioning circuit of the aircraft, mounted in a line connecting the tank for cryogenic fuel to the mixing chamber and in a line to be connected to the air-conditioning circuit of the aircraft, the heat exchange taking place therein so as to cool the air of the air-conditioning circuit of the aircraft and to increase the temperature of the cryogenic fuel coming from the tank.

19 Claims, 5 Drawing Sheets

(56) References Cited

U.S. PATENT DOCUMENTS

| | | |
|---|---|---|
| 2015/0337730 A1 | 11/2015 | Kupiszewski et al. |
| 2020/0088102 A1 | 3/2020 | Roberge |
| 2021/0301720 A1* | 9/2021 | Staubach ................ F02C 1/007 |
| 2022/0364513 A1* | 11/2022 | Muldoon .................. F02C 3/22 |
| 2023/0010158 A1* | 1/2023 | Muldoon .................. F02C 9/40 |
| 2023/0045911 A1* | 2/2023 | Smith ....................... F02C 7/36 |
| 2023/0075009 A1* | 3/2023 | Ranjan .................. B64D 41/00 |
| 2023/0080053 A1* | 3/2023 | Emerson ................ B64D 37/30 |
| 2023/0258130 A1* | 8/2023 | Terwilliger ............ F02C 7/141 |
| | | 60/266 |

\* cited by examiner

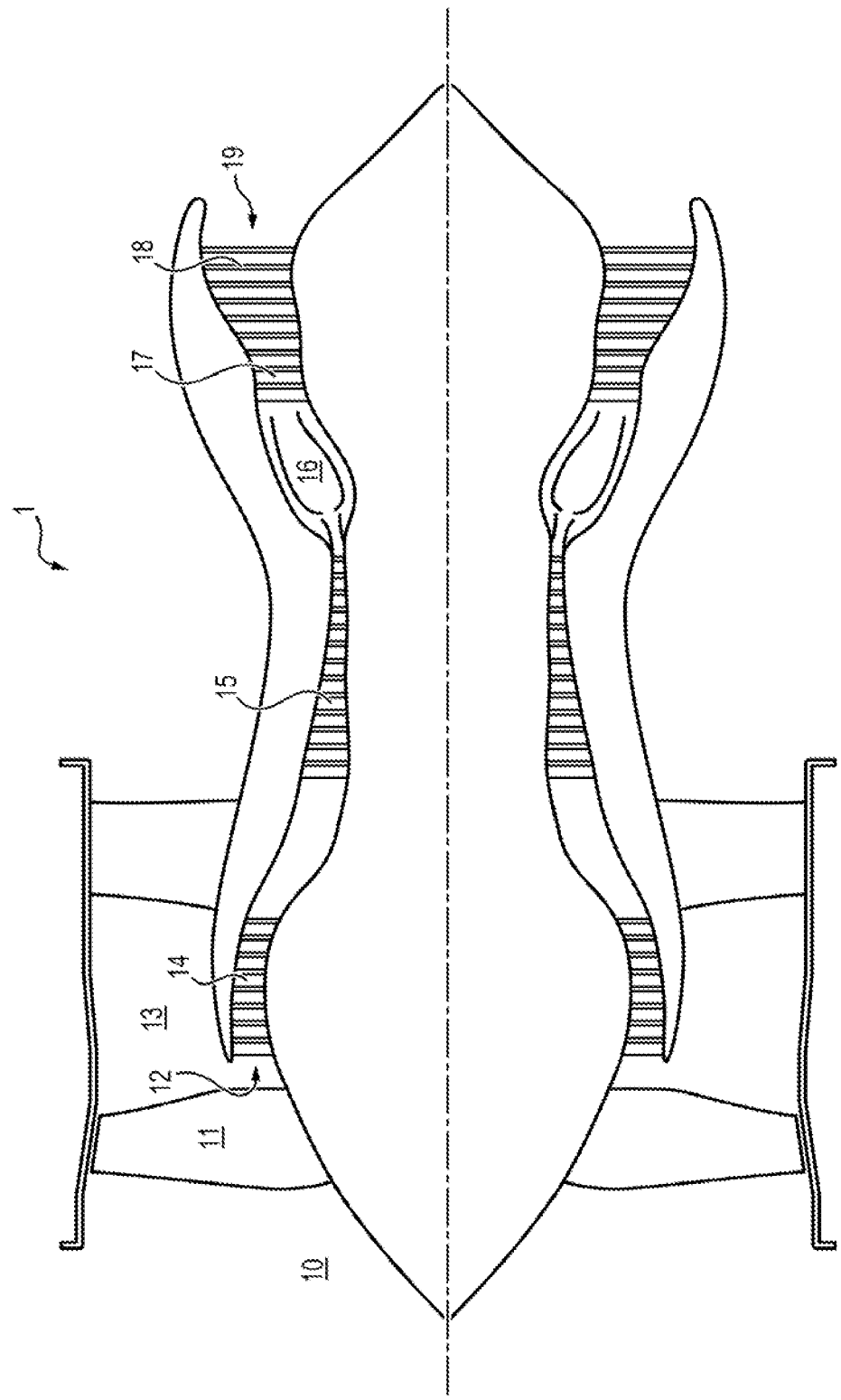
[Fig. 1]

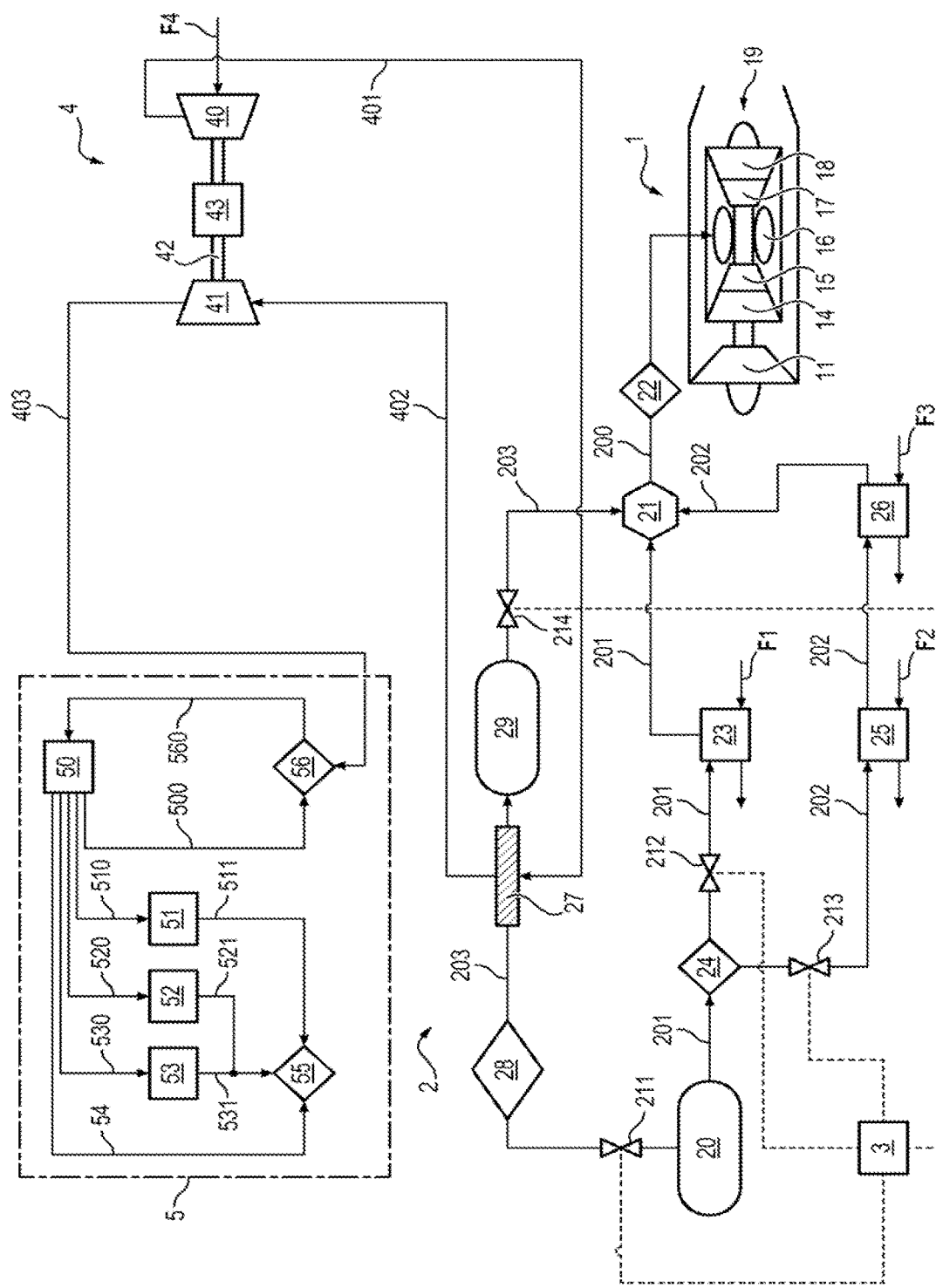
[Fig. 2]

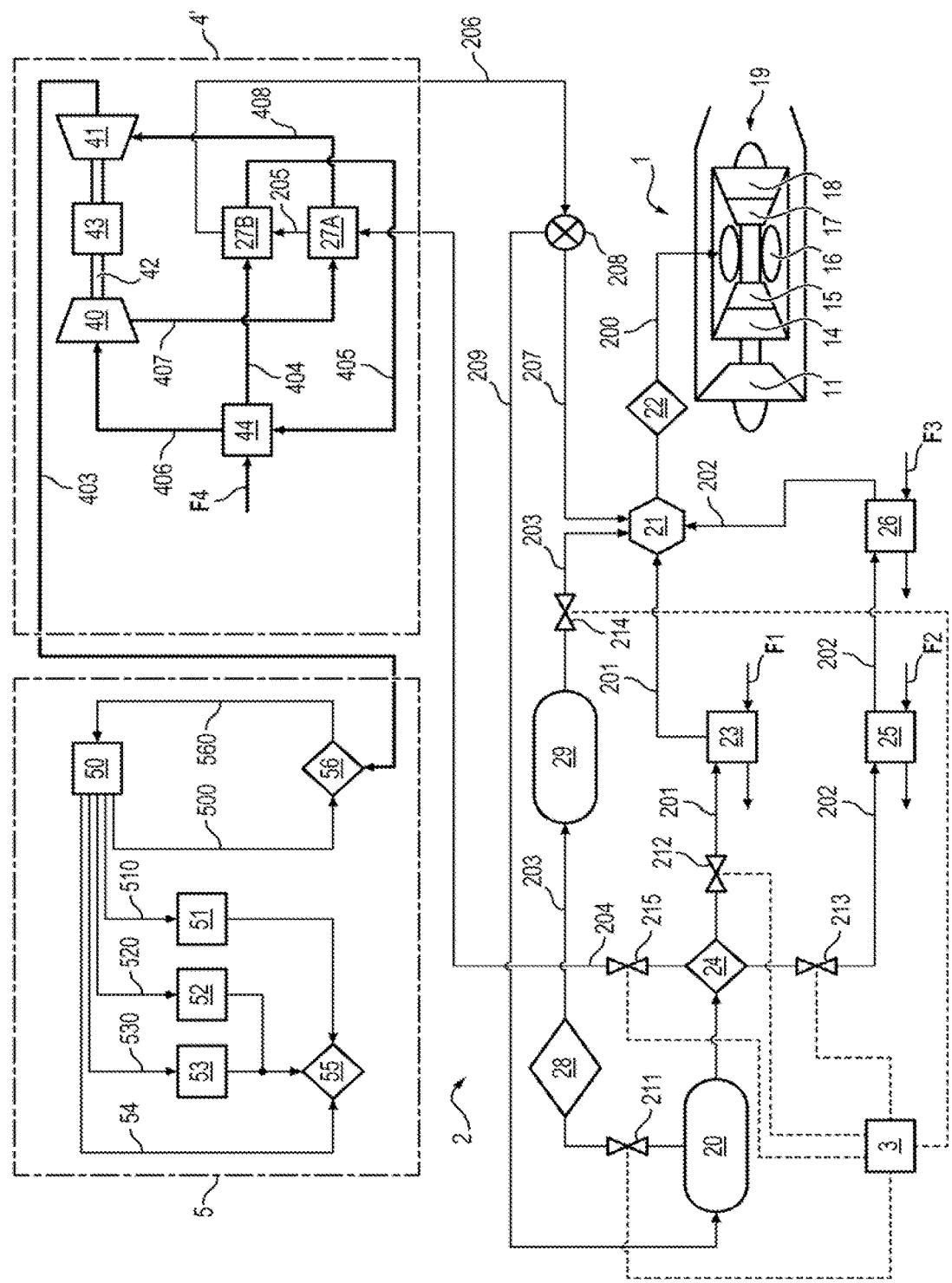
[Fig. 3]

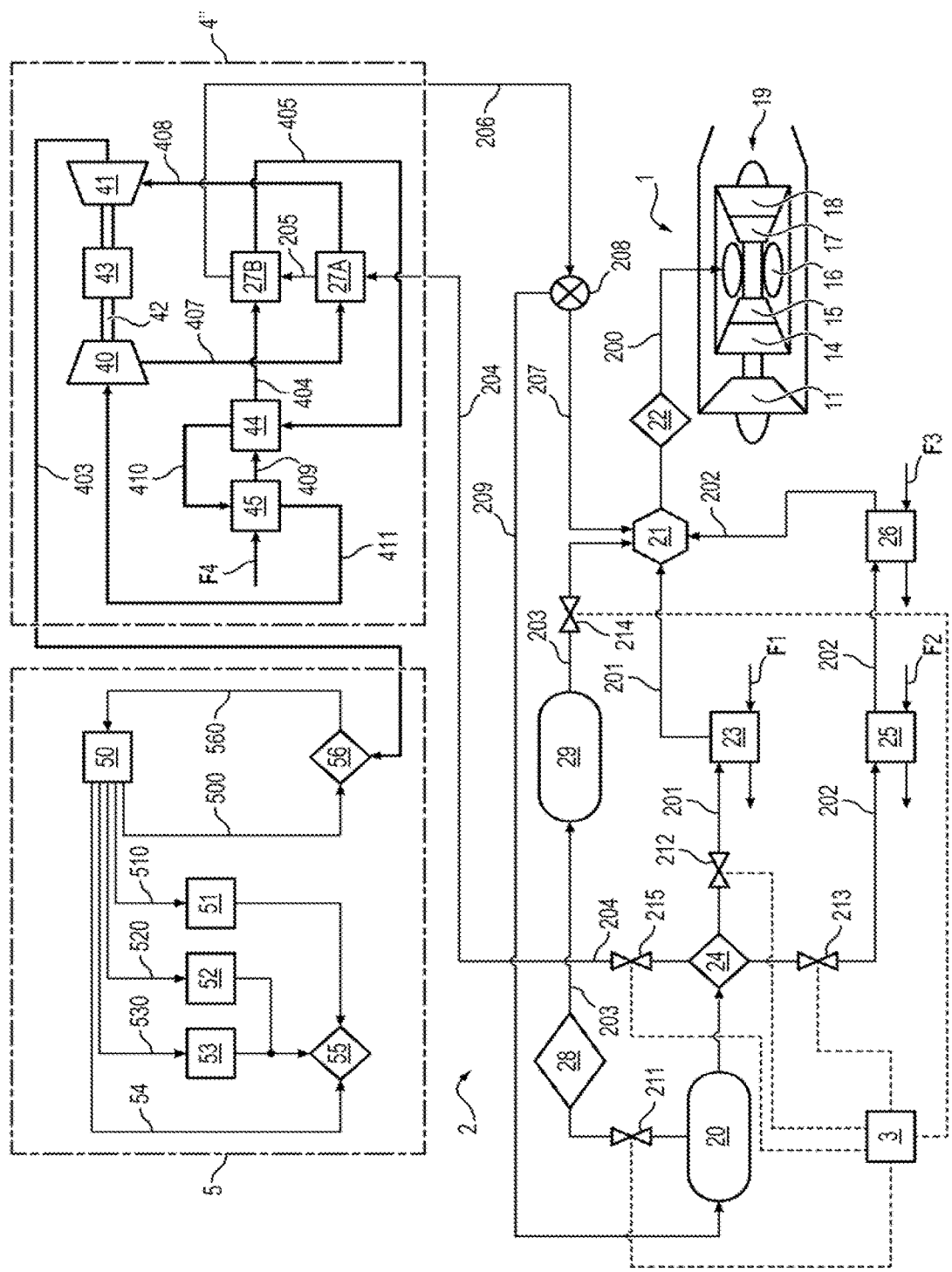
[Fig. 4]

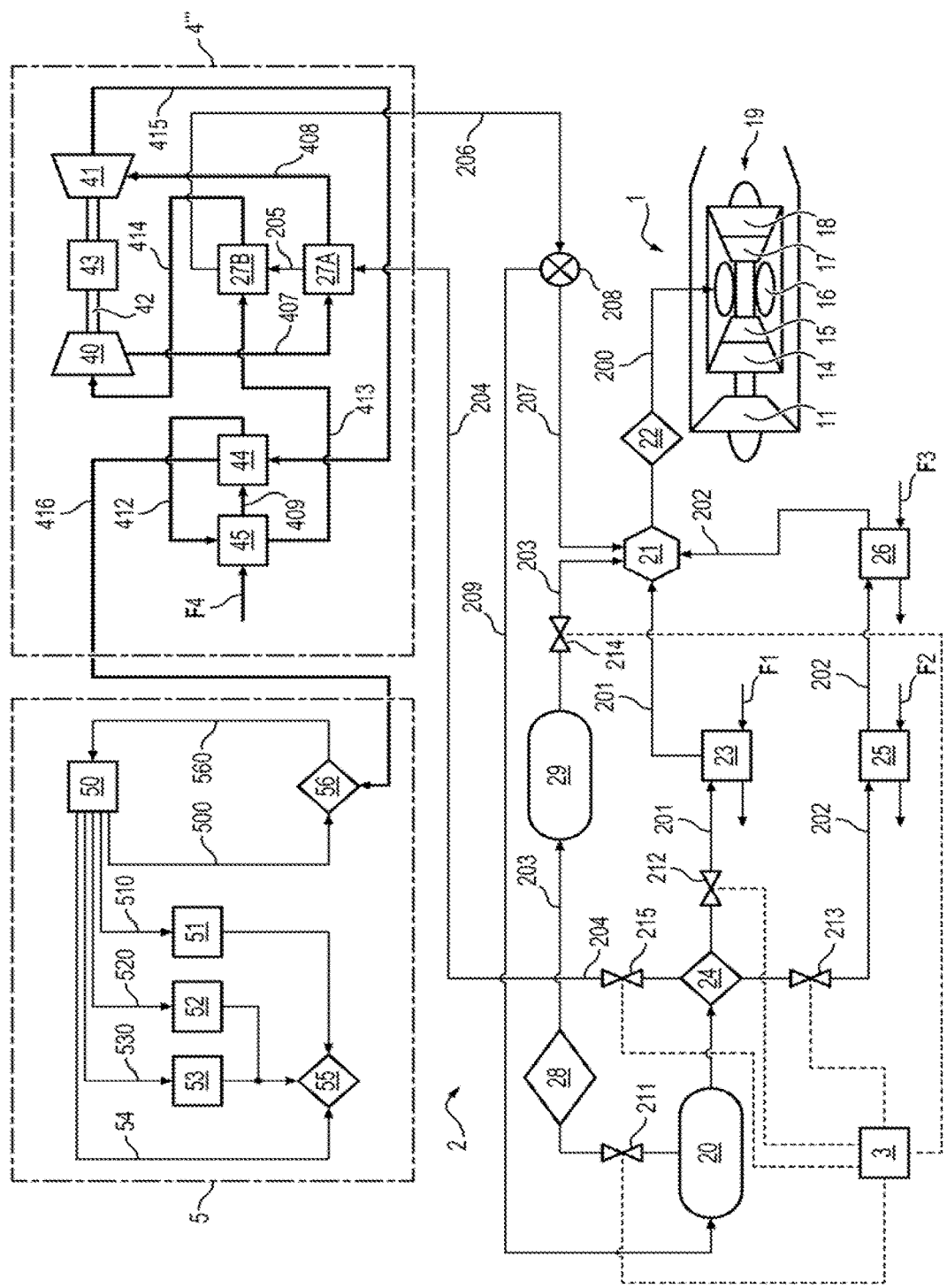
[Fig. 5]

INSTALLATION FOR SUPPLYING CRYOGENIC FUEL TO THE COMBUSTION CHAMBER OF A TURBINE ENGINE

CROSS REFERENCE TO RELATED APPLICATIONS

This application is a National Stage of International Application No. PCT/FR2021/050963 filed May 27, 2021, claiming priority based on French Patent Application No. 2005640 filed May 28, 2020, the contents of each of which being herein incorporated by reference in their entireties.

FIELD OF THE INVENTION

The invention is in the field of aircraft turbine engines.

The present invention relates, more precisely, to an installation for supplying cryogenic fuel to the combustion chamber of a turbine engine of an aircraft and to a turbine engine of an aircraft comprising a primary air stream successively provided with at least one air compressor, a combustion chamber supplied with cryogenic fuel and at least one turbine, this turbine engine being equipped with said installation for supplying cryogenic fuel.

PRIOR ART

Cryogenic fuels are usually used for space propulsion because they enable better thermodynamic yields. Their transposition to the field of aeronautics and the industrialisation of their large-scale use however requires a certain number of technical problems to be solved.

Thus, the use of liquid hydrogen has been proposed because it would enable $CO_2$ emissions to be reduced to zero.

Another cryogenic fuel that can be used is liquefied natural gas (known by the acronym LNG), which, in comparison to liquid hydrogen, has the additional advantage of being able to be used at much higher temperature, since its liquefaction temperature at 1 bar ($10^5$ Pa) is minus 161° C. as opposed to minus 252° C. for liquid hydrogen, which simplifies its use.

It could also be desirable to use the cryogenic fuel in the combustion chamber, no longer in the gaseous state but in the supercritical fluid state, which is not provided for in the cited prior art. As a reminder, it will be recalled that the fuel achieves the supercritical fluid state when it is at a temperature greater than its critical temperature and at a pressure greater than its critical pressure.

However, in the two above-mentioned cases, these cryogenic fuels still need to be transported in liquid form in order that their volume to be carried in the aircraft is acceptable, then vaporised and/or heated in order to be able to be used in a combustion chamber.

DISCLOSURE OF THE INVENTION

One object of the invention is therefore to provide an installation for supplying cryogenic fuel to the combustion chamber of a turbine engine of an aircraft, which can vaporise this liquid cryogenic fuel or bring it to a supercritical state in an ecologically and energetically advantageous manner.

To this effect, the invention relates to an installation for supplying cryogenic fuel to the combustion chamber of a turbine engine of an aircraft, this aircraft comprising an air-conditioning circuit.

According to the invention, this system comprises:
a tank for cryogenic fuel in the liquid state,
a mixing chamber receiving various flows of cryogenic fuel in the supercritical or gaseous state, this mixing chamber being configured to be connected to said combustion chamber for supplying same with cryogenic fuel in the supercritical or gaseous state,
at least one heat exchanger between the cryogenic fuel and the air of the air-conditioning circuit of the aircraft, mounted in a line connecting said cryogenic fuel tank to said mixing chamber and in a line configured to be connected to the air-conditioning circuit of the aircraft, the heat exchange taking place therein so as to cool the air of the air-conditioning circuit of the aircraft and to increase the temperature of the cryogenic fuel coming from said tank.

Through these features of the invention, it is possible to recover the heat coming from equipment present in the turbine engine to heat the cryogenic fuel and bring it into the gaseous or supercritical phase.

More precisely, the presence of a heat exchanger between the cryogenic fuel and the air of the air-conditioning circuit of the aircraft makes it possible to heat this fuel while reducing the size of the exchangers used in an air-conditioning circuit and/or reducing the complexity of the system.

According to other advantageous and non-limiting features of the invention, taken alone or in combination:
the installation comprises at least one heat exchanger between the cryogenic fuel and the air circulating in the air compressor of the turbine engine, mounted in a line connecting said cryogenic fuel tank to said mixing chamber, the heat exchange taking place therein so as to heat the cryogenic fuel and cool the air circulating in the air compressor of the turbine engine,
the installation comprises at least one cryogenic fuel/lubricating oil heat exchanger, mounted in a line connecting said cryogenic fuel tank to said mixing chamber, the heat exchange taking place therein so as to heat the cryogenic fuel and cool the lubricating oil,
the installation comprises at least one heat exchanger between the cryogenic fuel and the cooling air of the turbine blades of the turbine engine, mounted in the line connecting the cryogenic fuel tank to said mixing chamber, in series and downstream of the cryogenic fuel/lubricating oil heat exchanger, the heat exchange taking place therein so as to heat the cryogenic fuel coming from the cryogenic fuel/lubricating oil heat exchanger and cool the cooling air of the turbine blades of the turbine engine,
at least one of the heat exchangers among the heat exchanger between the cryogenic fuel and the air of the air-conditioning circuit of the aircraft, the heat exchanger between the cryogenic fuel and the air circulating in the air compressor of the turbine engine, the cryogenic fuel/lubricating oil heat exchanger and the heat exchanger between the cryogenic fuel and cooling air of the turbine blades of the turbine engine is a supercritical exchanger which can bring the cryogenic fuel to a temperature greater than its critical temperature.
at least one of the heat exchangers among the heat exchanger between the cryogenic fuel and the air of the air-conditioning circuit of the aircraft, the heat exchanger between the cryogenic fuel and the air circulating in the air compressor of the turbine engine, the cryogenic fuel/lubricating oil heat exchanger and the heat exchanger between the cryogenic fuel and the cooling air of the turbine blades of the turbine engine is an exchanger which can allow the passage of the cryogenic fuel into the gaseous state.

the heat exchanger between the cryogenic fuel and the air of the air-conditioning circuit of the aircraft is a heat exchanger between the vaporised cryogenic fuel and the air of the air-conditioning circuit of the aircraft, which carries out a heat exchange between the air of the air-conditioning circuit of the aircraft and the cryogenic fuel which is vaporised inside said cryogenic fuel tank.

the heat exchanger between the cryogenic fuel and the air of the air-conditioning circuit of the aircraft is a heat exchanger between the cryogenic fuel and the air of the air-conditioning circuit of the aircraft, which carries out a heat exchange between the air of the air-conditioning circuit of the aircraft and the cryogenic fuel stored in said cryogenic fuel tank.

the installation comprises a high-pressure compressor of vaporised cryogenic fuel, which compresses the cryogenic fuel which is vaporised inside said cryogenic fuel tank and a buffer tank for storage of cryogenic fuel in the gaseous state, mounted in series in a line connecting the upper part of the cryogenic fuel tank to said mixing chamber, the buffer tank being mounted downstream of said high-pressure compressor of vaporised cryogenic fuel.

the heat exchanger between the vaporised cryogenic fuel and the air of the air-conditioning circuit of the aircraft is mounted in the line connecting the upper part of the cryogenic fuel tank to said mixing chamber, between the high-pressure compressor of vaporised cryogenic fuel and the buffer tank for storage of cryogenic fuel in the gaseous state.

the installation comprises a first heat exchanger between the cryogenic fuel and the air of the air-conditioning circuit of the aircraft and a second heat exchanger between the cryogenic fuel and the air of the air-conditioning circuit of the aircraft, mounted in series between the cryogenic fuel tank and said mixing chamber.

the installation comprises a first high-pressure pump, disposed between the mixing chamber and the combustion chamber, and which bring the cryogenic fuel originating from this mixing chamber, to high pressure, before its introduction into said combustion chamber.

the installation comprises at least one heat exchanger between the cryogenic fuel and the air circulating in the air compressor of the turbine engine, mounted in a line connecting said cryogenic fuel tank to said mixing chamber, the heat exchange taking place therein so as to heat the cryogenic fuel and cool the air circulating in the air compressor of the turbine engine, at least one cryogenic fuel/lubricating oil heat exchanger, mounted in a line connecting said cryogenic fuel tank to said mixing chamber, the heat exchange taking place therein so as to heat the cryogenic fuel and cool the lubricating oil, and the heat exchanger between the cryogenic fuel and the air circulating in the air compressor of the turbine engine and the cryogenic fuel/lubricating oil heat exchanger are mounted in parallel between the cryogenic fuel tank and the mixing chamber.

the installation comprises at least one heat exchanger between the cryogenic fuel and the air circulating in the air compressor of the turbine engine, mounted in a line connecting said cryogenic fuel tank to said mixing chamber, the heat exchange taking place therein so as to heat the cryogenic fuel and cool the air circulating in the air compressor of the turbine engine, at least one cryogenic fuel/lubricating oil heat exchanger, mounted in a line connecting said cryogenic fuel tank to said mixing chamber, the heat exchange taking place therein so as to heat the cryogenic fuel and cool the lubricating oil, and comprises a second high-pressure pump, disposed downstream of the cryogenic fuel tank and upstream of the heat exchanger between the cryogenic fuel and the air circulating in the air compressor of the turbine engine and upstream of the cryogenic fuel/lubricating oil heat exchanger.

said second high-pressure pump can bring the cryogenic fuel to a pressure greater than its critical pressure.

the installation comprises at least one valve upstream of each heat exchanger and in that the opening and closing of these various valves are controlled by a central control unit.

the cryogenic fuel is chosen from liquid hydrogen and liquefied natural gas.

The invention also relates to a turbine engine of an aircraft comprising a primary air stream successively provided with at least one air compressor, a combustion chamber supplied with cryogenic fuel and at least one turbine.

According to the invention, this turbine engine comprises an installation for supplying cryogenic fuel to its combustion chamber, as mentioned above.

DESCRIPTION OF THE FIGURES

Other features, aims and advantages of the invention will emerge from the following description, which is given purely by way of illustration and not being limiting and which should be read with reference to the attached drawings, in which:

FIG. 1 shows an overview of a turbine engine, capable of being equipped with an installation for supplying cryogenic fuel to its combustion chamber, in accordance with the invention.

FIG. 2 is a schematic view of a first embodiment of the installation for supplying cryogenic fuel in accordance with the invention.

FIG. 3 is a schematic view of a second embodiment of the installation for supplying cryogenic fuel in accordance with the invention.

FIG. 4 is a schematic view of a third embodiment of the installation for supplying cryogenic fuel in accordance with the invention.

FIG. 5 is a schematic view of a fourth embodiment of the installation for supplying cryogenic fuel in accordance with the invention.

In all of the figures, the same elements are given identical reference signs.

DETAILED DESCRIPTION OF THE INVENTION

The invention relates to an installation for supplying cryogenic fuel to the combustion chamber of a turbine engine of an aircraft, such as an aeroplane.

FIG. 1 shows an example of such a turbine engine 1. In this case, this is a twin-spool bypass turbine engine.

This turbine engine 1 comprises successively, in the direction of the air circulation, in other words from upstream (to the left in FIG. 1) to downstream (to the right in FIG. 1), an air inlet 10 in which a fan 11 is located, which delivers the air, on the one hand, into a primary stream 12 and, on the other hand, into a secondary stream 13. The term "stream"

shall mean the volume (here in the form of an annular channel) through which an air flow circulates.

The air flow circulating in the primary stream 12 successively passes through a low-pressure air compressor 14, a high-pressure air compressor 15, a combustion chamber 16, a high-pressure turbine 17 and a low-pressure turbine 18, before being discharged through a primary flow nozzle 19.

Other types of turbine engine could be equipped with the cryogenic fuel supply installation in accordance with the invention, without going beyond the scope of the invention, for example a single-spool turbine engine, which then comprises only one air compressor and only one turbine, connected together by a shaft, the combustion chamber being interposed between this air compressor and this turbine.

The installation 2 for supplying cryogenic fuel, in accordance with the invention, will now be described in conjunction with FIG. 2.

This installation 2 comprises a tank 20 for storage of cryogenic fuel in the liquid state. This cryogenic fuel is intended to supply the combustion chamber 16, via various lines which will be described below.

This cryogenic fuel is for example liquefied natural gas or liquid hydrogen.

It will be noted that although the cryogenic fuel is stored in the liquid state in the tank 20 and although the latter is preferably thermally insulated, a portion of this fuel can vaporise inside the tank and accumulate in the upper part thereof.

The installation 2 comprises a mixing chamber 21 which receives various flows of cryogenic fuel in the supercritical or gaseous state. This mixing chamber 21 is connected to the combustion chamber 16 via a line 200, so as to allow this chamber to be supplied with cryogenic fuel in the supercritical or gaseous state.

Although it is not shown in the figures, an injector injects the fuel into the combustion chamber 16.

Advantageously, a first high-pressure pump 22 is disposed in the line 200 between the mixing chamber 21 and the combustion chamber 16, so as to bring the cryogenic fuel in the gaseous or supercritical state and originating from the mixing chamber 21, to high pressure, before its introduction into this combustion chamber 16. The air compressor or compressors compress the air upstream of the combustion chamber 16, so that a relatively high pressure prevails there (for example at least 50 bars, i.e. $50.10^5$ Pa). In order that the fuel can be sprayed into the chamber 16, it must therefore be introduced at a pressure greater than that of the chamber 16. The efficiency of the thermodynamic cycle of the turbine engine is thus improved.

Preferably, the installation 2 also comprises at least one heat exchanger 23 between the liquid cryogenic fuel and the air circulating in the compressor of the turbine engine.

This heat exchanger 23 is mounted in a line 201 connecting said cryogenic fuel tank 20 (preferably a point located on the lower part thereof) to said mixing chamber 21. In the lower part of the tank 20, the cryogenic fuel is liquid. The exchanger 23 enables a heat exchange in order, on the one hand, to heat the cryogenic fuel originating from this tank 20 and, on the other hand, to cool the air circulating in the compressor (represented schematically by the flow F1 in the figures). The heat exchanger reduces the temperature of the entire flow of the compressor in order to reduce the work necessary for the compression. This is called "intercooling". The heat exchange can be carried out at the same time as the compression and the exchanger 23 is therefore disposed, for example, in the casing of the compressor. It is also possible to dispose the exchanger 23 between the low-pressure compressor 14 and the high-pressure compressor 15.

According to a first alternative embodiment, the exchanger 23 is a two-phase exchanger and allows the liquid cryogenic fuel to pass into the gaseous state. This exchanger 23 is therefore, for example, a shell-and-tube exchanger.

According to a second alternative embodiment, the exchanger 23 can allow the cryogenic fuel to be brought to a temperature greater than its critical temperature. The exchanger 23 is then referred to as a "supercritical" exchanger.

A second high-pressure pump 24 is preferably disposed in the line 201, downstream of the tank 20 and upstream of the heat exchanger 23.

Preferably, in the case where the exchanger 23 is supercritical, the pump 24 is chosen to allow the cryogenic fuel to be brought to a pressure greater than its critical pressure.

The installation 2 preferably also comprises a cryogenic fuel/lubricating oil heat exchanger 25.

This heat exchanger 25 is mounted in a line 202 connecting the cryogenic fuel tank 20 to the mixing chamber 21. The line 202 is preferably connected to the second high-pressure pump 24, when this is present.

This heat exchanger 25 enables a heat exchange in order, on the one hand, to heat the cryogenic fuel originating from the tank 20 and, on the other hand, to cool the lubricating oil that is used to lubricate various mechanical elements of the turbine engine 1. The arrow F2 in the figures represents this flow of lubricating oil.

Inside the turbine engine, a certain number of mechanical elements must indeed be cooled by the lubricating oil in order to maintain their mechanical integrity. These mechanical elements are, for example, a reduction gear of an accessories gearbox or bearings supporting a rotating shaft. The oil, which has heated in contact with these mechanical elements, thus leaves the exchanger 25 cooled, and can then be sent back into contact with various above-mentioned mechanical elements.

According to a first alternative embodiment, the exchanger 25 is a two-phase exchanger, preferably a plate-fin exchanger. It allows the liquid cryogenic fuel to pass into the gaseous state.

According to a second alternative embodiment, the exchanger 25 can allow the cryogenic fuel to be brought to a temperature greater than its critical temperature. The exchanger 25 is then referred to as a "supercritical" exchanger.

The installation 2 preferably also comprises a heat exchanger 26 between the cryogenic fuel and the cooling air of the turbine blades of the turbine engine 1. This heat exchanger 26 is mounted in the line 202, in series with the heat exchanger 25 and downstream thereof, with respect to the direction of circulation of the cryogenic fuel in the line 202. The exchanger 26 is also located upstream of the mixing chamber 21.

This exchanger 26 can, on the one hand, heat the cryogenic fuel in the gaseous state, if it is below the critical pressure and temperature, or in the supercritical state if it is above the critical pressure and temperature, originating from the exchanger 25 and, on the other hand, cool the air which is used to cool the blades of the single turbine or of the high-pressure turbine 17 and the low-pressure turbine 18 in the case of a twin-spool turbine engine. (The arrow F3 in the figures represents this flow of cooling air.

The air that is used to cool the turbine blades is taken from the outlet of the compressor. At the outlet of the compressor, this air is hot. The use of the cryogenic fuel as a cold source also enables further cooling of the air that is used for cooling the blades and thus uses less than in the technique of the prior art and therefore enables less of it to be taken at the outlet of the compressor (in particular the high-pressure compressor). A larger quantity of compressed air, originating from the compressor, can therefore be directed into the combustion chamber 16 and the overall efficiency of the turbine engine is thus improved.

The injection of a cold fuel into the combustion chamber 16 reduces the combustion efficiency. It is therefore preferable to heat this cryogenic fuel again, even after it has changed phase or passed into the supercritical state in the exchanger 25.

This exchanger 26 can be a two-phase exchanger, for example a plate-fin exchanger or a shell-and-tube exchanger, or can be a supercritical exchanger.

The second high-pressure pump 24 enables the pressure of the liquid cryogenic fuel to be increased before it enters the exchangers 23 and 25. Preferably, in the case where the exchanger 25 and/or the exchanger 26 is supercritical, then the pump 24 is chosen to bring the cryogenic fuel to a pressure greater than its critical pressure.

In the various exchangers 23, 25 and 26, the flows F1, F2 and F3 circulate in counter-current with respect to the cryogenic fuel.

It should be noted that, as represented in the figures, the exchanger 23 is mounted in parallel with exchangers 25 and 26.

The installation 2 further comprises at least one heat exchanger between the cryogenic fuel and the air of the air-conditioning circuit of the aircraft, which therefore interacts with the air-conditioning circuit belonging to the aircraft.

In the exemplary embodiment of the installation 2 shown in FIG. 2, this heat exchanger is of the heat exchanger type between the vaporised cryogenic fuel and the air of the air-conditioning circuit of the aircraft and is given reference sign 27.

The heat exchanger 27 is mounted in a line 203 which connects the tank 20 to the mixing chamber 21. More specifically, this line 203 is connected to the upper part of the tank 20, inside which the vaporised cryogenic fuel is accumulated.

This exchanger 27 can further heat the vaporised cryogenic fuel which is therefore found in the gaseous state, and cool the air circulating in the air-conditioning circuit of the aircraft, as will be described in more detail below.

This exchanger 27 is preferably a two-phase exchanger, preferably a plate-fin exchanger.

Advantageously, a third high-pressure pump (or high-pressure compressor) 28 is disposed in the line 203 downstream of the tank 20 and upstream of the heat exchanger 27. Such a pump can increase the pressure of the cryogenic fuel before its introduction into the exchanger 27.

Advantageously, a buffer tank of cryogenic fuel in the gaseous state 29 is mounted in the line 203 downstream of the exchanger 27 and upstream of the mixing chamber 21. Thus, during ground movements of the aircraft, the gaseous cryogenic fuel originating from the exchanger 27 is stored in this buffer tank 29. During the flight phases of the aircraft, this additional reserve of gaseous cryogenic fuel can then be released from the tank 29, in order to supply the combustion chamber 16, after passage into the mixing chamber 21.

A valve 211, 212, 213 is preferably disposed upstream of each heat exchanger 27, 23 and 25 respectively, in the respective lines 203, 201 and 202, in order to regulate the flow circulating in these various exchangers. A valve 214 is also preferably disposed in the line 203, downstream of the buffer tank 29, in order to accumulate the gaseous fuel in this buffer tank 29 or, by contrast, to allow the passage of this gaseous fuel reserve to the mixing chamber 21, according to need. The opening and closing of these various valves are controlled by a central control unit 3, such as a computer or a programmable logic controller.

An exemplary embodiment of the air-conditioning circuit 4 of the aircraft will now be described in conjunction with FIG. 2.

This circuit 4 comprises a compressor 40 for the air to be conditioned and a turbine 41 for the air to be conditioned, connected together via a drive shaft 42. An additional motor 43 placed on the shaft 42 provides a mechanical energy supplement in order that the turbine 41 can drive the rotation of the compressor 40.

The incoming air, taken at the outlet of the air compressors 14 or 15, or of a dedicated compressor of the aircraft, is represented in the diagram by the arrow F4. This incoming hot air enters the compressor 40, where it is compressed and made hotter, then circulates in a line 401 which connects the compressor 40 to the heat exchanger 27 between the vaporised cryogenic fuel and the air of the air-conditioning circuit of the aircraft. It supplies heat to the vaporised cryogenic fuel, which also circulates there. The slightly cooled compressed air then circulates in a line 402, which connects the exchanger 27 to the turbine 41. The air is expanded and cooled again in the turbine 41, where it emerges via a line 403, in order to be directed into the conditioned air circuit 5 of the aircraft. It thus emerges at an appropriate temperature for the passengers located in the cabin and to be mixed with the recirculation flow in a mixing chamber 56 described below.

An exemplary embodiment of this conditioned air distribution circuit 5 of the aircraft will now be described. Other embodiments of this circuit 5 are possible, without going beyond the scope of the invention.

Inside the aircraft, the conditioned air is intended to be sent inside the cabin space 50, but also to the avionics and electrical elements 51, into the toilets and the kitchen space 52 and, in the hold, into the cargo storage space 53. Finally, a part of this conditioned air also escapes into the aircraft in the form of leaks, (see reference sign 54). All of these air flows are then evacuated outside of the aircraft via the outlet 55.

The line 403 is preferably connected to an air-conditioned mixing chamber 56. The air leaving this chamber 56 is directed towards the cabin space 50 via a line 560. The air, leaving the cabin space 50, is directed towards the avionics and electrical elements 51, the toilets and the kitchen space 52, and the cargo 53 via the lines respectively referenced 510, 520 and 530 and emerges towards the outlet 55 via the lines respectively referenced 511, 521 and 531. Finally, a recirculation of a portion of the air from the cabin space 50 towards the air-conditioned mixing chamber 56 is possible via a line 500.

A second embodiment of the air-conditioning circuit of the aircraft will now be described in conjunction with FIG. 3. This circuit is given reference sign 4'.

It differs from the preceding circuit in that it further comprises a condenser-type heat exchanger 44.

Furthermore, in the installation 2, there is no longer the heat exchanger 27 between the vaporised cryogenic fuel and the air of the air-conditioning circuit of the aircraft but, in its place, there is at least one heat exchanger between the cryogenic fuel and the air of the air-conditioning circuit of the aircraft, preferably two of these types of exchangers, respectively referenced 27A for the first and 27B for the second. These two exchangers are mounted in series in a line which connects the storage tank 20, more precisely the second high-pressure pump 24, to the mixing chamber 21.

The line which connects the second high-pressure pump 24 to the first exchanger 27A has reference sign 204, that which connects together the two exchangers 27A to 27B has reference sign 205 and those which connect the second exchanger 27B to the mixing chamber 21, have reference signs 206 and 207.

A valve 215 is preferably placed in the line 204 upstream of the second high-pressure pump 24 and downstream of the first exchanger 27A. It is controlled by the central control unit 3.

In addition, advantageously, it is possible to provide a 3-way valve 208 the inlet of which is connected to the line 206 and the two outlets of which are connected respectively to the line 207 and to a line 209 which connects the 3-way valve 208 to the storage tank 20.

A portion of the cryogenic fuel stored in the tank 20 can be directed via the line 204 to the first exchanger 27A, in which this very cold fuel is heated. Once heated, the cryogenic fuel enters the second exchanger 27B, in which it is further heated.

The exchangers 27A, 27B can be either two-phase (the fuel passes through it in the gaseous state or phase-change to pass into the gaseous state), or supercritical (the fuel passes through it at a temperature greater than its critical temperature). It emerges to be directed towards the 3-way valve 208.

This valve 208 can occupy a first position in which all of the gaseous or supercritical cryogenic fuel is directed towards the mixing chamber 21, a second position in which all of the gaseous or supercritical cryogenic fuel is directed towards the tank 20, and finally a plurality of intermediate positions in which a certain percentage of the gaseous or supercritical cryogenic fuel is directed towards the tank 20 and the remainder towards the mixing chamber 21, as a function of the flight phases of the aircraft. At take-off the fuel is preferably directed to the chamber 21, during the descent phase or on the ground the fuel is directed to the tank 20 and, when cruising, the valve 208 is in the intermediate positions.

Furthermore, in the air-conditioning circuit 4' of the aircraft, the incoming hot air flow represented by the arrow F4, successively passes through the condenser 44, then via a line 404, through the second heat exchanger 27B between the liquid cryogenic fuel and the air of the air-conditioning circuit of the aircraft. It emerges via a line 405 in order to return through the condenser 44 and performs a heat exchange there (in other words, this air circulating in the line 405 and which has cooled, is used to condense water present in the incoming air flow F4 and remove the humidity. It emerges from the condenser 44 via a line 406 to enter the compressor 40 for the air to be conditioned, where it is compressed and heated. It emerges from the compressor 40, via a line 407 to pass through the first heat exchanger 27A between the cryogenic fuel and the air of the air-conditioning circuit of the aircraft. It emerges cooled from the first exchanger 27A via a line 408, to enter the air-conditioning turbine 41 and finally, it emerges, as before, via the line 403 to be directed to the air-conditioned mixing chamber 56.

A third alternative embodiment of the air-conditioning circuit of the aircraft will now be described in conjunction with FIG. 4. This circuit is given reference sign 4".

The elements identical to circuit 4' have the same numerical reference signs.

This circuit 4" differs from the circuit 4' in that it comprises a heater 45. The incoming air flow F4 enters the circuit 4" via this heater 45. The heater 45 is connected to the condenser 44 via a line 409. In addition, for return, the condenser 44 is connected to the heater 45 via a line 410. Finally, the heater 45 is connected to the compressor 40 via a line 411.

The operation of the heat exchanges in the circuit 4" differs from that of the circuit 4', in that the incoming air flow F4 is cooled in the heater 45 then passes through the condenser 44 where it cools further, and in that the air flow leaving the condenser 44 after having passed through the second heat exchanger 27B, is hotter at the outlet of the condenser 44 and when it passes through the heater 45, it recovers the heat from the incoming air flow F4, before being directed to the compressor 40.

A fourth alternative embodiment of the air-conditioning circuit of the aircraft will now be described in conjunction with FIG. 5. This circuit is given reference sign 4'''. It comprises the same elements as the circuit 4". However, the circulation from one element to another differs. The lines which are identical with circuits 4, 4' and 4" have the same numerical reference signs.

The condenser 44 is connected to the heater 45 via a line 412 and the heater 45 is connected to the second heat exchanger 27B via a line 413. The second heat exchanger 27B is connected to the compressor 40 via a line 414. The turbine 41 is connected to the condenser 44 via a line 415. Finally, the condenser 44 is connected to the air-conditioned mixing chamber 56 via a line 416.

The heat exchanges in the circuit 4''' differ from those of the circuit 4", in that the air leaving the condenser 44 is used to cool the incoming air F4 circulating in the heater 45. This air, which has passed through the condenser 44 and which leaves the heater 45 (via the line 413) is directed to the second exchanger 27B in order to cause the heated cryogenic fuel, leaving the first exchanger 27A, to be even hotter. The cooled air leaving the second exchanger 27B is sent to the compressor 40, in which it is both compressed and heated. It leaves this in order to pass through the first exchanger 27A and supplies heat to the very cold cryogenic fuel that leaves the tank 20. This cooled air is sent to the turbine 41 to be expanded and further cooled there. At the outlet of the turbine 41, this air is sent back to the condenser 44 where it is heated by heat exchange with the air flow leaving the heater 45 and is finally directed to the air-conditioned mixing chamber 56.

When the exchangers 27A and 27B are supercritical type, then preferably the pump 24 is also.

Although it is not shown in the embodiments of FIGS. 2 to 5, it would also be possible to have the heat exchanger 27 in the line 203, in addition to exchangers 27A and 27B.

The distribution of the various flows of liquid cryogenic fuel in the lines 204, 201 and 202, is made by means of the opening or closing of valves 215, 212 and respectively 213, as a function of the flight phases.

The tank 29, the valve 214 and the high-pressure pump 28 are shown in FIGS. 3 to 5 but are optional and are only used for managing the "boil-off" of the fuel due to an imperfect thermal insulation of the fuel tank 20.

As a reminder, it will be recalled that hydrogen has a critical point at 32 K (minus 241.15° C.) for its critical temperature and 12.8 bars ($12.8.10^5$ Pa) for its critical pressure, and that natural gas has a critical point at 190 K (minus 83.15° C.) for its critical temperature and 46.8 bars ($46.8.10^5$ Pa) for its critical pressure.

The invention claimed is:

1. An installation for supplying a cryogenic fuel to a combustion chamber of a turbine engine of an aircraft, the aircraft comprising an air-conditioning circuit, wherein the installation comprises:
   a tank for cryogenic fuel in the liquid state,
   a mixing chamber receiving various flows of cryogenic fuel in the supercritical or gaseous state, this mixing chamber being configured to be connected to the combustion chamber for supplying same with cryogenic fuel in the supercritical or gaseous state,
   at least one heat exchanger between the cryogenic fuel and air of the air-conditioning circuit of the aircraft, mounted in a line connecting said tank for cryogenic fuel to said mixing chamber and in a line configured to be connected to the air-conditioning circuit of the aircraft, the heat exchange taking place therein so as to cool the air of the air-conditioning circuit of the aircraft and to increase the temperature of the cryogenic fuel coming from said tank.

2. The installation according to claim 1, wherein the installation comprises at least one heat exchanger between the cryogenic fuel and the air circulating in the air compressor of the turbine engine, mounted in a line connecting said tank for cryogenic fuel to said mixing chamber, the heat exchange taking place therein so as to heat the cryogenic fuel and cool the air circulating in the air compressor of the turbine engine.

3. The installation according to claim 1, wherein the installation comprises at least one cryogenic fuel/lubricating oil heat exchanger, mounted in a line connecting said tank for cryogenic fuel to said mixing chamber, the heat exchange taking place therein so as to heat the cryogenic fuel and cool the lubricating oil.

4. The installation according to claim 3, wherein the installation comprises at least one heat exchanger between the cryogenic fuel and the cooling air of the turbine blades of the turbine engine, mounted in the line connecting the cryogenic fuel tank to said mixing chamber, in series and downstream of the cryogenic fuel/lubricating oil heat exchanger, the heat exchange taking place therein so as to heat the cryogenic fuel coming from the cryogenic fuel/lubricating oil heat exchanger and cool the cooling air of the turbine blades of the turbine engine.

5. The installation according to claim 1, wherein the heat exchanger between the cryogenic fuel and the air of the air-conditioning circuit of the aircraft is a supercritical exchanger which can bring the cryogenic fuel to a temperature greater than its critical temperature or is an exchanger which can allow the passage of the cryogenic fuel into the gaseous state.

6. The installation according to claim 1, wherein the heat exchanger between the cryogenic fuel and the air of the air-conditioning circuit of the aircraft
   is a heat exchanger between the vaporised cryogenic fuel and the air of the air-conditioning circuit of the aircraft, which carries out a heat exchange between the air of the air-conditioning circuit of the aircraft and the cryogenic fuel which is vaporised inside said tank for cryogenic fuel
   or is a heat exchanger between the cryogenic fuel and the air of the air-conditioning circuit of the aircraft, which carries out a heat exchange between the air of the air-conditioning circuit of the aircraft and the cryogenic fuel stored in said tank for cryogenic fuel.

7. The installation according to claim 1, wherein the installation comprises a high-pressure compressor of vaporised cryogenic fuel, which compresses the cryogenic fuel which is vaporised inside said cryogenic fuel tank and a buffer tank for storage of cryogenic fuel in the gaseous state, mounted in series in a line connecting the upper part of the cryogenic fuel tank to said mixing chamber, the buffer tank being mounted downstream of said high-pressure compressor of vaporised cryogenic fuel.

8. The installation according to claim 7, wherein the heat exchanger between the cryogenic fuel and the air of the air-conditioning circuit of the aircraft is a heat exchanger between the vaporised cryogenic fuel and the air of the air-conditioning circuit of the aircraft, which carries out a heat exchange between the air of the air-conditioning circuit of the aircraft and the cryogenic fuel which is vaporised inside said tank for cryogenic fuel,
   and wherein the heat exchanger between the vaporised cryogenic fuel and the air of the air-conditioning circuit of the aircraft is mounted in the line connecting the upper part of the cryogenic fuel tank to said mixing chamber, between the high-pressure compressor for vaporised cryogenic fuel and the buffer tank for storage of cryogenic fuel in the gaseous state.

9. The installation according to claim 1, wherein the installation comprises a first heat exchanger between the cryogenic fuel and the air of the air-conditioning circuit of the aircraft and a second heat exchanger between the cryogenic fuel and the air of the air-conditioning circuit of the aircraft, mounted in series between the cryogenic fuel tank and said mixing chamber.

10. The installation according to claim 1, wherein the installation comprises a first high-pressure pump, disposed between the mixing chamber and the combustion chamber, and which bring the cryogenic fuel originating from this mixing chamber, to high pressure, before its introduction into said combustion chamber.

11. The installation according to claim 1, wherein the installation comprises:
   at least the heat exchanger between the cryogenic fuel and the air circulating in the air compressor of the turbine engine, mounted in a line connecting said cryogenic fuel tank to said mixing chamber, the heat exchange taking place therein so as to heat the cryogenic fuel and cool the air circulating in the air compressor of the turbine engine,
   at least the cryogenic fuel/lubricating oil heat exchanger, mounted in a line connecting said cryogenic fuel tank to said mixing chamber, the heat exchange taking place therein so as to heat the cryogenic fuel and cool the lubricating oil,
   and wherein the heat exchanger between the cryogenic fuel and the air circulating in the air compressor of the turbine engine and the cryogenic fuel/lubricating oil heat exchanger are mounted in parallel between the cryogenic fuel tank and the mixing chamber.

12. The installation according to claim 1, wherein the installation comprises:
   at least the heat exchanger between the cryogenic fuel and the air circulating in the air compressor of the turbine engine, mounted in a line connecting said cryogenic fuel tank to said mixing chamber, the heat exchange taking place therein so as to heat the cryogenic fuel and cool the air circulating in the air compressor of the turbine engine,
   at least the cryogenic fuel/lubricating oil heat exchanger, mounted in a line connecting said cryogenic fuel tank to said mixing chamber, the heat exchange taking place therein so as to heat the cryogenic fuel and cool the lubricating oil, and wherein the installation comprises a second high-pressure pump, disposed downstream of the cryogenic fuel tank and upstream of the heat exchanger between the cryogenic fuel and the air circulating in the air compressor of the turbine engine and upstream of the cryogenic fuel/lubricating oil heat exchanger.

13. The installation according to claim 12, wherein said second high-pressure pump brings the cryogenic fuel to a pressure greater than its critical pressure.

14. The installation according to claim 1, comprising at least one valve upstream of each heat exchanger and a control unit that opens and closes the at least one valve.

15. The installation according to claim 1, wherein the cryogenic fuel is chosen from liquid hydrogen and liquefied natural gas.

16. A turbine engine of an aircraft comprising a primary air stream successively provided with at least one air compressor, a combustion chamber supplied with cryogenic fuel and at least one turbine, wherein the turbine engine comprises the installation for supplying cryogenic fuel to the combustion chamber of the turbine engine in accordance with claim 1.

17. The installation according to claim 1, wherein the heat exchanger between the cryogenic fuel and the air circulating in the air compressor of the turbine engine is a supercritical exchanger which can bring the cryogenic fuel to a temperature greater than its critical temperature or is an exchanger which can allow the passage of the cryogenic fuel into the gaseous state.

18. The installation according to claim 1, wherein the cryogenic fuel/lubricating oil heat exchanger is a supercritical exchanger which can bring the cryogenic fuel to a temperature greater than its critical temperature or is an exchanger which can allow the passage of the cryogenic fuel into the gaseous state.

19. The installation according to claim 1, wherein the heat exchanger between the cryogenic fuel and the cooling air of the turbine blades of the turbine engine is a supercritical exchanger which can bring the cryogenic fuel to a temperature greater than its critical temperature or is an exchanger which can allow the passage of the cryogenic fuel into the gaseous state.

* * * * *